United States Patent [19]
Lepold

[11] Patent Number: 5,855,517
[45] Date of Patent: Jan. 5, 1999

[54] RELEASABLE COUPLING FOR MACHINE TOOLS

[75] Inventor: Holger Lepold, Steinheim/Murr, Germany

[73] Assignee: Flex-Elektrowerkzeuge GmbH, Steinheim/Murr, Germany

[21] Appl. No.: 685,583

[22] Filed: Jul. 24, 1996

[30] Foreign Application Priority Data

Jul. 27, 1995 [DE] Germany ................. 195 27 411.3

[51] Int. Cl.⁶ .................................................. F16D 7/08
[52] U.S. Cl. ............................................................ 464/36
[58] Field of Search .............................. 464/30, 35, 36, 464/37, 38; 192/56.5, 56.51, 56.52, 56.53, 56.54

[56] References Cited

U.S. PATENT DOCUMENTS

| | | | |
|---|---|---|---|
| 2,344,673 | 3/1944 | Brown | 464/36 X |
| 2,683,362 | 7/1954 | Bowman | 464/36 |
| 2,802,354 | 8/1957 | Bohnhoff et al. | 464/36 |
| 3,119,247 | 1/1964 | Grabovac | 464/36 |
| 3,185,275 | 5/1965 | Orwin | 464/36 X |
| 3,722,644 | 3/1973 | Steinhagen | 464/36 X |
| 3,979,925 | 9/1976 | Kato | 464/35 |
| 4,263,996 | 4/1981 | Putney | 464/36 X |
| 4,838,400 | 6/1989 | Fortune | 464/36 X |
| 5,346,022 | 9/1994 | Krivec | 464/37 X |

FOREIGN PATENT DOCUMENTS

| | | | |
|---|---|---|---|
| 4208672 | 9/1993 | Germany | 464/35 |
| 631822 | 1/1988 | Japan | 464/35 |

*Primary Examiner*—Daniel P. Stodola
*Assistant Examiner*—Gregory J. Strimbu
*Attorney, Agent, or Firm*—Barry R. Lipsitz; Ralph F. Hoppin

[57] ABSTRACT

A releasable coupling for motorized machine tools including first and second coupling elements which are uncoupled when a predetermined triggering torque occurs. The first coupling element includes first locking elements, such as balls, while the second coupling element includes corresponding second locking elements, such as recesses. The first coupling element includes a concentric holding element. The holding element is rotatable with respect to the first and second coupling element between an inactive position and an active position. In the inactive position, the holding element allows the first and second locking elements to engage one another to maintain the first and second coupling elements in a coupled arrangement. After the predetermined triggering torque has occurred and the holding element is rotated into the active position, the holding element prevents the first and second locking elements from engaging one another to maintain the first and second coupling elements in a uncoupled arrangement. When the first and second locking elements are disengaged and the holding element is in the active position, the first and second locking elements are rotatable with respect to one another into, and away from, a coupling rotary position. When the holding element is in the active position, the holding element prevents an elastic force from acting on the first and second locking elements when they are in the coupling rotary position, thereby preventing the first and second locking elements from engaging one another.

28 Claims, 9 Drawing Sheets

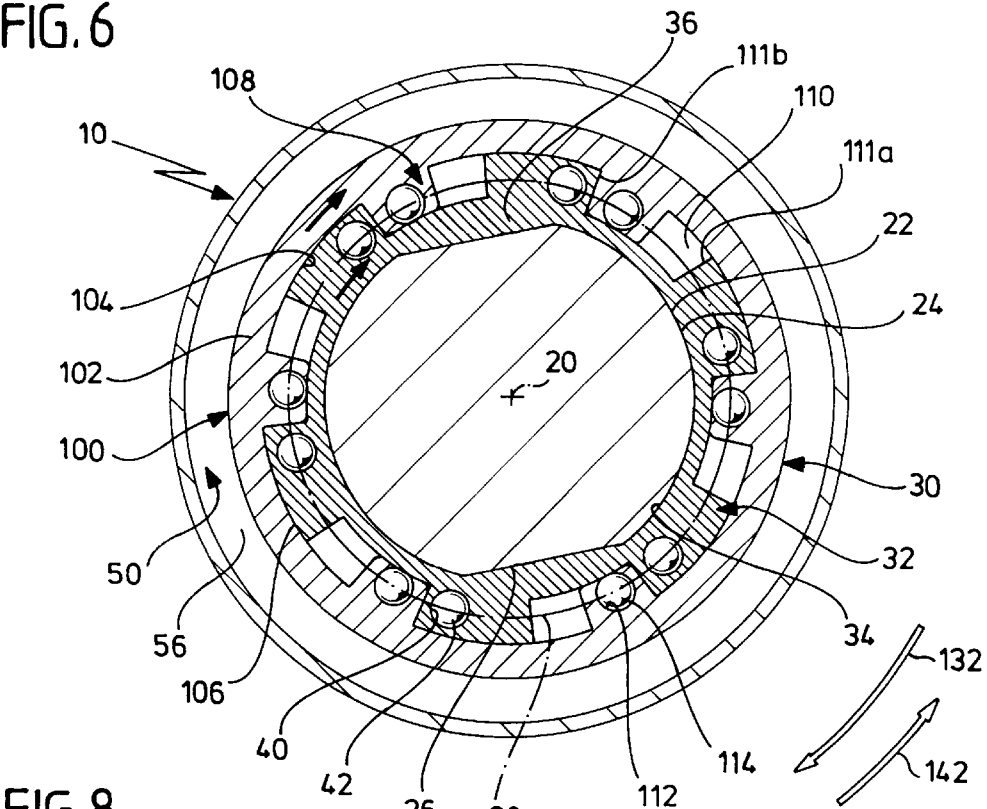

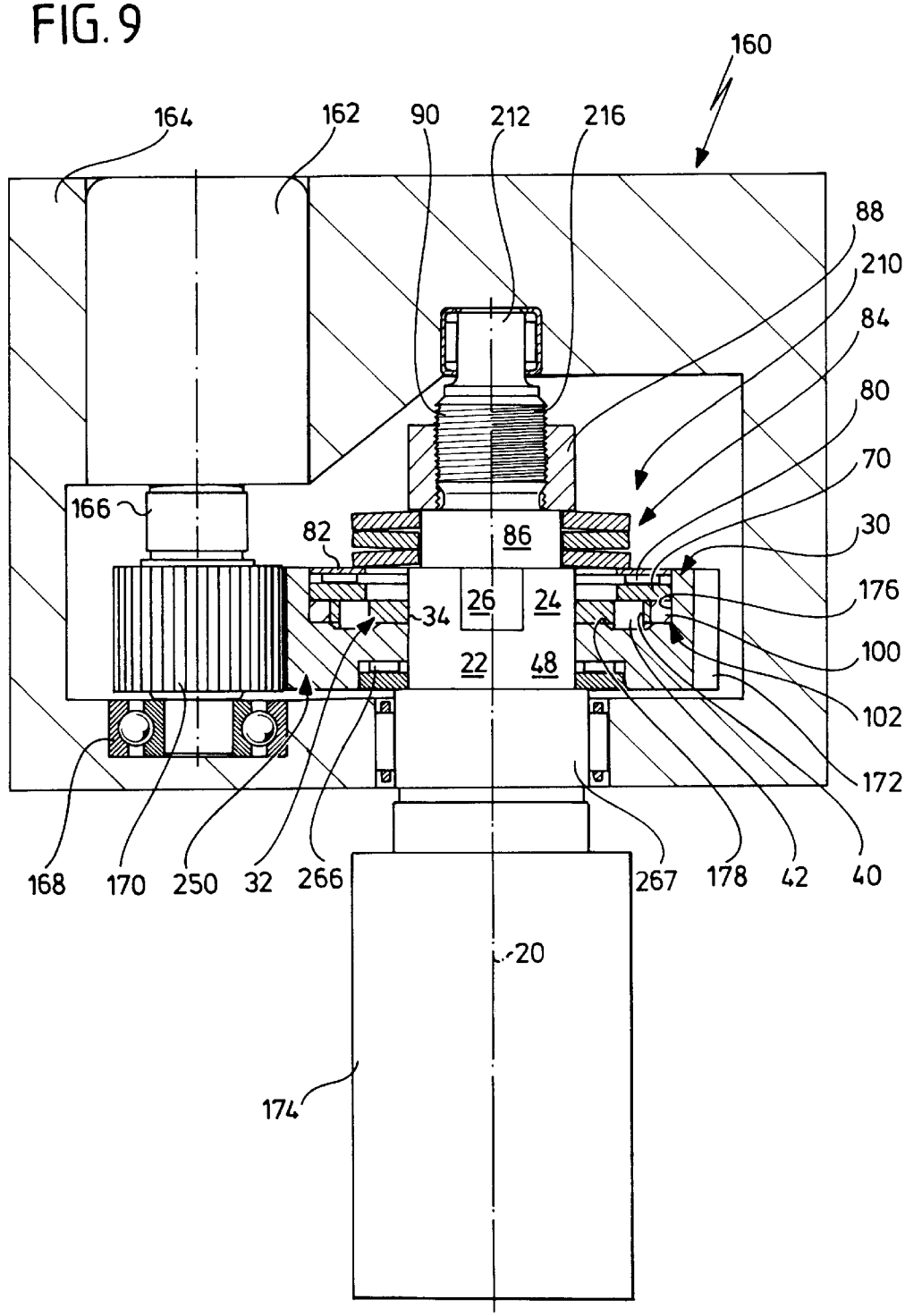

RELEASABLE COUPLING FOR MACHINE TOOLS

BACKGROUND OF THE INVENTION

The invention relates to a coupling, in particular for machine tools driven by a motor, which is releasable when a predetermined triggering torque occurs, comprising a coupling element rotatable about an axis of rotation and having at least one first locking element, and an additional coupling element rotatable about the axis of rotation and having at least one second locking element, wherein in a coupled position the locking elements are aligned in a defined coupling rotary position relative to one another and in relation to the axis of rotation and are in an operative position engaging in one another and wherein in an uncoupled position the locking elements are disengaged in an inoperative position, and an elastic force storing means which acts on the locking elements in the coupled position in the sense of maintaining the coupled position.

Couplings of this type are known for machine tools driven by a motor. These serve primarily as safety couplings in order to prevent any further operation when the tool is blocked and thus any breaking of the tool or any release of the machine tool from its attachment.

Couplings of this type are preferably used in machine tools for driving drilling tools, in particular drill bits.

The known couplings are predominantly claw couplings, with which the locking elements designed as claws disengage at the occurrence of the countertorque in their momentary coupling rotary position but always engage again in additional, possible coupling rotary positions and must then be caused to disengage again by means of the triggering torque so that such known couplings "chatter". As a result, not only does a torque corresponding to the triggering torque occur at the first disconnection of the coupling but always subsequent to this additional torques of the order of magnitude of the triggering torque which act on the drive side of the coupling and, therefore, result in an increased wear and tear and/or increased attachment requirements not only with regard to the coupling but also on the drive side.

The object underlying the invention is therefore to improve a coupling of the generic type such that this no longer "chatters".

SUMMARY OF THE INVENTION

This object is accomplished in accordance with the invention, in a coupling of the type described at the outset, in that the coupling has a holding element, that the holding element is movable from an inactive position into an active position once the triggering torque has occurred, that the holding element in the active position prevents any transition of the locking elements from the inoperative position into the operative position in every coupling rotary position, this transition being triggered by the action of the elastic force storing means, and that the holding element in the inactive position allows a transition of the locking elements from the inoperative position into the operative position in every coupling rotary position, this transition being triggered by the elastic force storing means.

A coupling rotary position within the meaning of the inventive solution is to be understood, in particular, as all the rotary positions of the coupling elements relative to one another, in which the locking elements have the possibility of engaging in one another and of passing automatically into the coupled position as a result of their shape, e.g. with the action of the elastic force storing means.

The advantage of the inventive solution is to be seen in the fact that once the triggering torque has been reached once the holding element in its active position prevents any transition of the locking elements from the inoperative position into the operative position and therefore the "chattering" of the coupling no longer occurs and, consequently, the triggering torque also occurs only once and then need no longer be used up so that not only the coupling but also the machine tool and the tool are subject to less wear and tear.

With the inventive solution, the locking elements, in particular, are to be arranged on the respective associated coupling elements such that these follow the rotational movement of the respective coupling element in all positions thereof. This means that the locking elements are, for example, either rigidly connected to the respective coupling element or the respective coupling element forms a receiving means or a cage so that the locking element is taken along by the coupling element during a rotation about the axis of rotation.

So that the inventive coupling acts as a safety coupling, it is particularly advantageous that once the triggering torque has occurred the holding element prevents a transition of the locking elements from the inoperative position into the operative position when the respective coupling rotary position is reached for as long as the coupling is being driven on the drive side. This ensures that the coupling remains in the uncoupled position until the drive is switched off and the undesired high triggering torques cannot occur a number of times.

With respect to the manner, in which the holding element is transferred from the inactive into the active position, the most varied of possibilities are conceivable. A particularly advantageous possibility provides for the holding element to be brought from the inactive into the active position by means of a relative rotational movement between the coupling elements in the uncoupled position. The advantage of this solution is to be seen in the fact that this utilizes the relative movement between the coupling elements which occurs in any case in order to transfer the holding element from the inactive into the active position.

It would, for example, be possible in this respect to merely convey a linear movement to the holding element. A solution is, however, particularly expedient, in which the holding element can be brought from the inactive into the active position by means of a rotational movement relative to at least one of the coupling elements.

The transfer of the holding element from the inactive position into the active position can be realized, however, in a particularly simple and reliable manner when the holding element can be brought from the inactive position into the active position by means of a relative rotational movement in relation to both coupling elements.

With respect to the action of the holding element for preventing the transition of locking member and locking member receiving means from the inoperative into the operative position in the coupling rotary position, the most varied possibilities are conceivable. One advantageous solution, for example, provides for the holding element to block any movement of the locking elements from the inoperative position into the operative position, i.e., either acts on the respective locking element or the coupling element comprising this locking element. This solution has the advantage that it ensures that the locking elements remain in their inoperative position.

Another alternative provides for the holding element to prohibit any action of the elastic force storing means on the locking elements in the sense of any movement thereof from the inoperative position into the operative position so that the locking elements do have the possibility of engaging but not under the influence of the elastic force storing means, and thus—should this be the case—can be disengaged again immediately without any large torque. The advantage of this solution is to be seen in the fact that no direct action on the locking elements is required but only an action on the elastic force storing means or the transfer elements arranged between this and the coupling or locking elements is required and this is simple to accomplish from a constructional point of view.

The holding element could, in principle, be operative in the most varied of ways. It would, for example, be conceivable for the holding element to be supported on a housing of the coupling. It is, however, particularly advantageous for the holding element to be supported in the active position on one of the coupling elements, for example a second coupling element. This solution has the great advantage that the holding element can be designed such that it interacts directly with the second coupling element in its active position and so the inventive coupling can be built particularly small from a constructional point of view.

The holding element is preferably supported on a side of the second coupling element directly facing it.

In this respect, it is particularly expedient when the holding element is unlimitedly rotatable about the axis of rotation relative to the second coupling element supporting it in the active position. This offers the possibility of having the holding element rotate in relation to the second coupling element when the coupling is in a released position.

Particularly expedient is an embodiment, in which the holding element in the active position is unlimitedly rotatable relative to the second coupling element together with a first coupling element so that the holding element can be rotated unlimitedly together with the first coupling element in the uncoupled position.

In this respect, it is particularly expedient when the holding element is limitedly rotatable in relation to the first of the coupling elements from a defined inactive rotary position into a defined active rotary position so that both rotary positions can easily be determined in a defined manner.

In order to preferably ensure that the holding element in its inactive rotary position relative to the first coupling element has the possibility of passing into its inactive position, the holding element and the second coupling element are designed such that in at least one defined initial rotary position of the two relative to one another the holding element can be transferred into the inactive position.

The initial rotary position of the holding element is to be understood as all the rotary positions of the holding element relative to the second coupling element, in which the holding element has the possibility, e.g. under the influence of the elastic force storing means, of passing into the inactive position.

Such an inventive coupling is preferably designed such that in the coupled position the holding element is located in the initial rotary position relative to the second coupling element and at the same time the locking elements are located in the coupling rotary position relative to one another and in this position the force storing means holds the locking elements in the operative position.

This embodiment is expediently designed, in addition, such that when the holding element is located in an active rotary position relative to the first coupling element either the locking elements are located outside their coupling rotary position and remain in their inoperative position when the holding element is located in an initial rotary position relative to the second coupling element or when the locking elements are located in a coupling rotary position the holding element is located outside the initial position and in its active position in relation to the second coupling element.

With this embodiment, the first coupling element and the second coupling element rotate relative to one another about the axis of rotation in the uncoupled position and the holding element rotates with the first coupling element, whereby, one time, the holding element reaches the initial rotary position during this rotational movement and another time the locking elements reach the coupling rotary positions but the initial rotary position and the coupling rotary position are never reached at the same time and so the uncoupled position is maintained.

In order to constantly maintain the inoperative position of the locking elements in the uncoupled position in an embodiment of the inventive coupling designed in this manner, a preferred alternative provides for the coupling elements to be designed such that these are held in their inoperative position outside the coupling rotary position of the locking elements. This means that it is merely necessary for the holding element to reach its active position when the coupling rotary position is reached and in this position prevent the locking elements from passing into their operative position.

In a second solution alternative to the preceding solution or supplementing it, it is provided for the holding element and the second coupling element to be designed such that these hold the holding element in its active position in all the positions outside the initial rotary position and thus prevent any transition of the locking elements from the inoperative into the operative position. This means that it is necessary only when the initial rotary position of the holding element relative to the second coupling element is reached for the coupling elements to be designed such that in this initial rotary position the locking elements do not pass from their inoperative into their operative position.

It is, however, also possible to amalgamate both alternatives to form a combined solution.

No details have been given in conjunction with the preceding description of the individual embodiments concerning the movement of the holding element from the inactive into the active position. For example, one advantageous embodiment provides for interacting adjusting elements to be provided for moving the holding element from the inactive into the active position.

The adjusting elements can be designed in the most varied of ways. It is preferably provided for at least one of the adjusting elements to have an inclined surface, the other adjusting element being movable in relation to this surface, wherein the inclined surface extends transversely to an adjusting direction of the adjusting device.

An adjusting cam and an adjusting cam outer support are preferably provided as adjusting elements, with one of the two expediently being arranged on the holding element and the other on the second coupling element.

In order to utilize the adjusting elements, in particular, in the embodiment, in which a transition from the active position into the inactive position takes place due to a rotational movement of the holding element, it is preferably provided for the adjusting elements to displace the holding element in the adjusting direction during a rotational movement of the holding element.

In a particularly advantageous embodiment, one of the locking elements is arranged on the second coupling element in a first pattern and one of the adjusting elements in a second pattern which is aligned in a defined relative position in relation to the first pattern, the other locking element is arranged on the first coupling element in the first pattern and the other one of the adjusting elements on the holding element in the second pattern, in the inactive rotary position of the holding element the second pattern of the holding element is located in the defined relative rotary position in relation to the first pattern of the first coupling element, as in the case of the second coupling element, and in the active rotary position of the holding element the second pattern of the holding element is rotated out of the defined relative rotary position in relation to the first pattern of the first coupling element.

Particularly favorable solutions, in particular in order to achieve symmetrical loads on the coupling elements, provide for several pairs of locking elements to be operative between the coupling elements. These pairs are preferably of an identical design and arranged in axial symmetry in relation to an axis of rotation of the coupling elements so that the possibility is thereby provided, in addition, of reaching a coupling rotary position during less than one revolution of the coupling elements relative to one another.

Furthermore, an additional, advantageous embodiment provides for several pairs of adjusting elements to be operative between the holding element and the second coupling element in order to likewise achieve a load thereon which is as even as possible.

The pairs of adjusting elements are also preferably of an identical design and arranged in an axially symmetrical pattern in relation to the axis of rotation, the axial symmetry expediently being the same as in the case of the locking elements so that the possibility is given of attaining a coupled position of the coupling with the holding element in an inactive rotary position and less than one revolution of the holding element relative to the second coupling element.

A particularly compact construction of the inventive coupling is possible when the coupling elements are arranged opposite one another. This solution can be made even more compact when the second coupling element and the holding element are likewise located opposite one another.

With respect to the possibilities of transferring the holding element from the inactive into the active position, no details have been given in conjunction with the preceding explanations of the individual embodiments. It would, in principle, be conceivable to have the holding element constantly acted upon by an elastic force storing means which—when possible—transfers this from the active position into the inactive position.

It is, however, particularly advantageous from a constructional point of view when, in the initial rotary position, the holding element can be transferred into the inactive position by the elastic force storing means acting on the locking elements.

This solution may be advantageously developed further from a constructional point of view in that the holding element can be transferred from its inactive position into the active position only when the locking elements are in their inoperative position so that the holding element need make no contribution to the locking elements reaching the inoperative position.

In addition, this solution can be advantageously developed further in that the holding element is freely movable from the inactive position into the active position when the locking elements are in the inoperative position so that no appreciable torque is required to attain the active position of the holding element.

This can be accomplished particularly favorably when the locking elements in the inoperative position prevent the elastic force storing means from acting on the holding element during the transition of the holding element from the inactive into the active position.

With respect to the design of the locking elements themselves, no details have been given in conjunction with the preceding description of the individual embodiments of the inventive coupling.

In an embodiment with a particularly simple design, for example, one of the locking elements is designed as a locking cam, this cam being rigidly connected with the corresponding coupling element. Such a cam can be integrally formed on a coupling element particularly easily, with the cam in the simplest case being formed on the coupling element in one piece.

In a solution, which is even more advantageous but more complicated, one of the locking elements is designed as a rolling body so that in the position, in which the locking element has to counteract the force of the elastic force storing means, the rolling body can roll along a corresponding countersurface and—in contrast to a rigid locking cam—no sliding friction occurs between the coupling elements but rolling friction and, thus, essentially no countertorque acts in the uncoupled position.

Such a rolling body could be designed in the simplest case such that it is mounted in the coupling element associated with it, for example in a corresponding recess partially surrounding the rolling body.

In the embodiment specified above, the elastic force storing means would preferably act on the coupling element mounting the rolling body, for example a corresponding contact surface thereof.

It is, however, even more advantageous when the rolling bodies penetrate the respective coupling element and on their side located opposite the other coupling element are acted upon directly by the elastic force storing means so that the elastic force storing means does not act on the coupling element itself but merely directly on the rolling bodies.

In order, in addition, to create the possibility of the rolling bodies being able to roll along the respectively other coupling element, it is preferably provided for the elastic force storing means to act on the rolling bodies by means of a pressure disk rotatable about the axis of rotation, this pressure disk preferably being mounted for rotation by an axial bearing. This solution has the great advantage that the rolling bodies can roll, on the one hand, along the respectively other coupling element and, on the other hand, along the pressure disk and thus a type of roller bearing results between the other coupling element and the pressure disk.

The elastic force storing means preferably comprises a stack of elastic force storing means, the pressure disk and an axial bearing operative between the two.

No details have so far been given with respect to the design of the other adjusting elements respectively interacting with the locking cams or rolling bodies as one of the adjusting elements. In one advantageous embodiment, for example, the other adjusting element has two wall surfaces, which extend transversely to the direction of rotation and between which the locking cam or the rolling body engages in its operative position.

These wall surfaces are, for example, the wall surfaces of recesses or also, for example, grooves, the grooves preferably being arranged to extend in radial direction in relation to the axis of rotation.

It is particularly expedient, in particular in order to be able to determine a defined triggering torque which is easily reproducible, when the wall surfaces of the other locking element form together with the locking cam or the rolling body at least one inclined surface which extends at an angle to the direction of rotation and due to the inclination of which the triggering torque can be defined.

No more detailed explanations have so far been given concerning the type of design of the adjusting elements. It is particularly advantageous when the adjusting elements are designed in the same manner as the locking elements so that a simple and inexpensive manufacture of the inventive coupling is already possible for reasons of functional efficiency.

In principle, the adjusting elements and the locking elements can be arranged in different patterns relative to the axis of rotation. It is, however, particularly expedient when the adjusting elements and the locking elements are arranged on the same circular path and are of an identical design so that the inventive coupling is particularly simple to produce due to the identity of adjusting and locking elements and, moreover, the one locking elements can also be brought into engagement with the respectively other adjusting elements and vice versa. This allows the coupling to be returned from the uncoupled position to the coupled position in a particularly simple manner since the one adjusting elements can engage with the other adjusting elements or locking elements which are closest in return direction and also the one locking elements can engage with the locking elements or adjusting elements closest in return direction.

Additional features and advantages of the invention are the subject matter of the following description as well as the drawings of several embodiments.

BRIEF DESCRIPTION OF THE DRAWINGS

FIG. 6 shows a section similar to FIG. 2 with a holding element in an active rotary position;

FIG. 7 shows a section similar to FIG. 3 with a holding element in an active rotary position relative to the first coupling element and a holding element in an initial rotary position relative to the second coupling element;

FIG. 8 shows a section similar to FIG. 3 with a holding element in an active rotary position and locking elements in a coupling rotary position;

FIG. 9 shows a longitudinal section through a second embodiment of an inventive coupling in a machine tool;

DETAILED DESCRIPTION OF THE INVENTION

Figure 1:
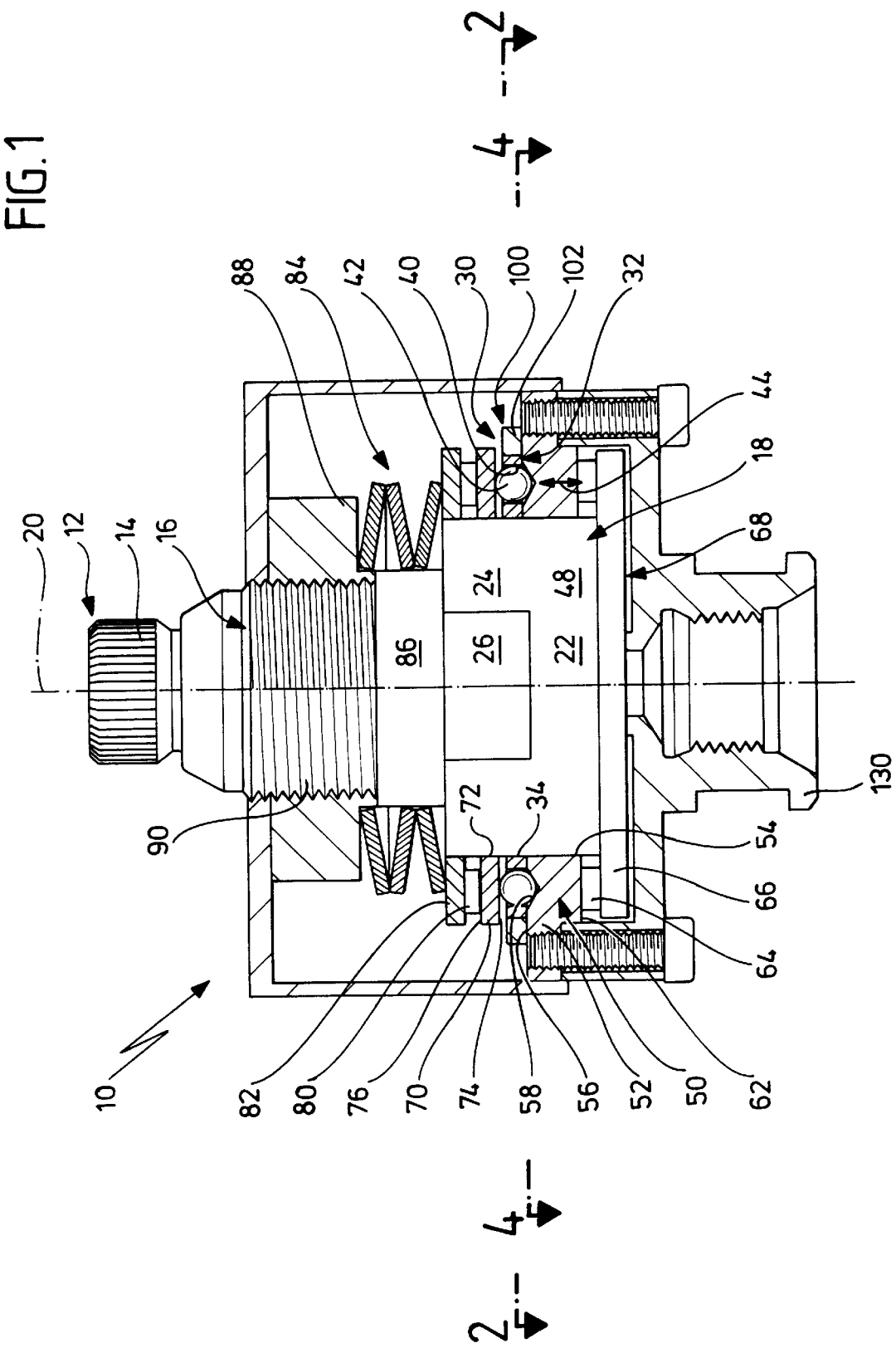
FIG. 1 shows a longitudinal section through a first embodiment of an inventive coupling.

A first embodiment of an inventive coupling, designated as a whole as 10 and illustrated in FIG. 1, comprises a stub shaft 16 which is driven at a first end 12, for example, by means of a toothed wheel 14 and which has at a region located opposite the first end a guide attachment 18 with an outer cylindrical surface 22 cylindrical to an axis of rotation 20 of the stub shaft 16.

The outer cylindrical surface 22 is provided in a section 24 12 with a flat surface 26 which faces a first end 12 and with which a first coupling element designated as a whole as 30 can be driven.

Figure 2:
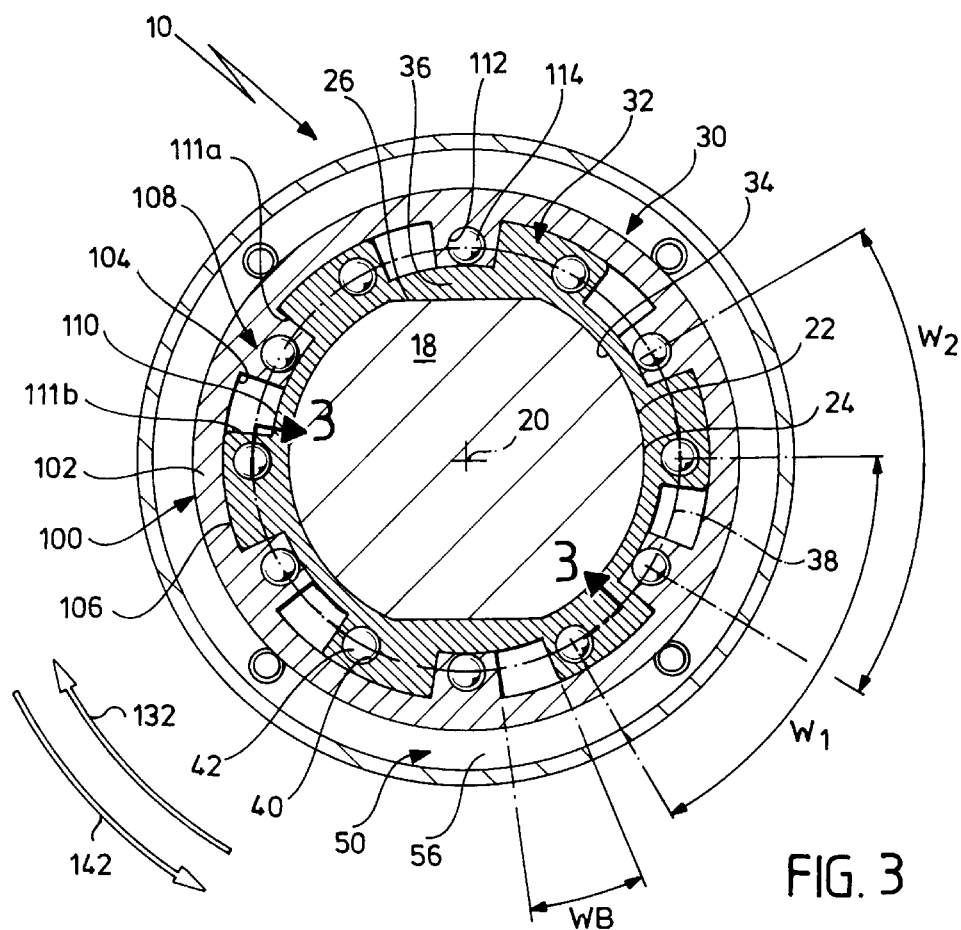
FIG. 2 shows a section along line 2—2 in FIG. 1, with locking elements located in a coupling rotary position and an operative position and a holding element located in an initial rotary position relative to a second one of the coupling elements and in an inactive rotary position relative to a first one of the coupling elements.
Figure 3:
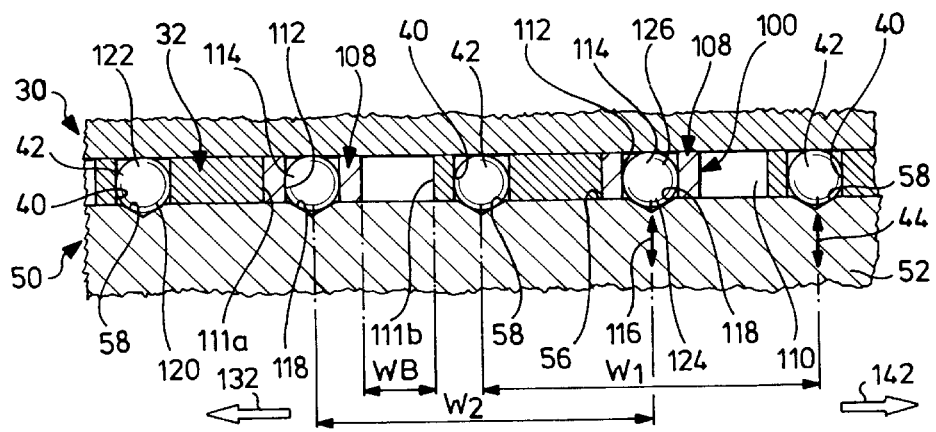
FIG. 3 shows a section in linear development along line 3—3 in FIG. 2 with locking elements located in a coupling rotary position and an operative position and the holding element located in an initial rotary position relative to the second one of the coupling elements and in an inactive rotary position relative to the first one of the coupling elements.

The first coupling element 30 comprises, as illustrated in FIGS. 1 and 2, a first ring 32 which is arranged coaxially to the axis of rotation 20, abuts with an inner ring surface 34 on the section 24 of the outer cylindrical surface 22 and with a projection 36 on the flat surfaces 26 so that the ring 32 is non-rotatably connected to the stub shaft 16. The ring 32 is, for its part, provided with a plurality of locking body mountings 40 which are arranged on a circular line 38 at equal angular distances W1 in relation to the axis of rotation 20, which are designed as passages through the ring 32 and in which locking bodies 42 are located, these locking bodies being designed as spheres and representing a first locking element and, as illustrated in FIG. 3, having a diameter which is greater than a thickness of the ring 32, measured in the direction parallel to the axis of rotation 20.

The locking body mountings 40 are thereby designed such that the locking bodies 42 are fixed in the ring 32 not only in radial direction in relation to the axis of rotation 20 but also in azimuthal direction and merely have the possibility of moving relative to the ring 32 in a locking direction 44 which extends parallel to the axis of rotation 20.

Figure 4:
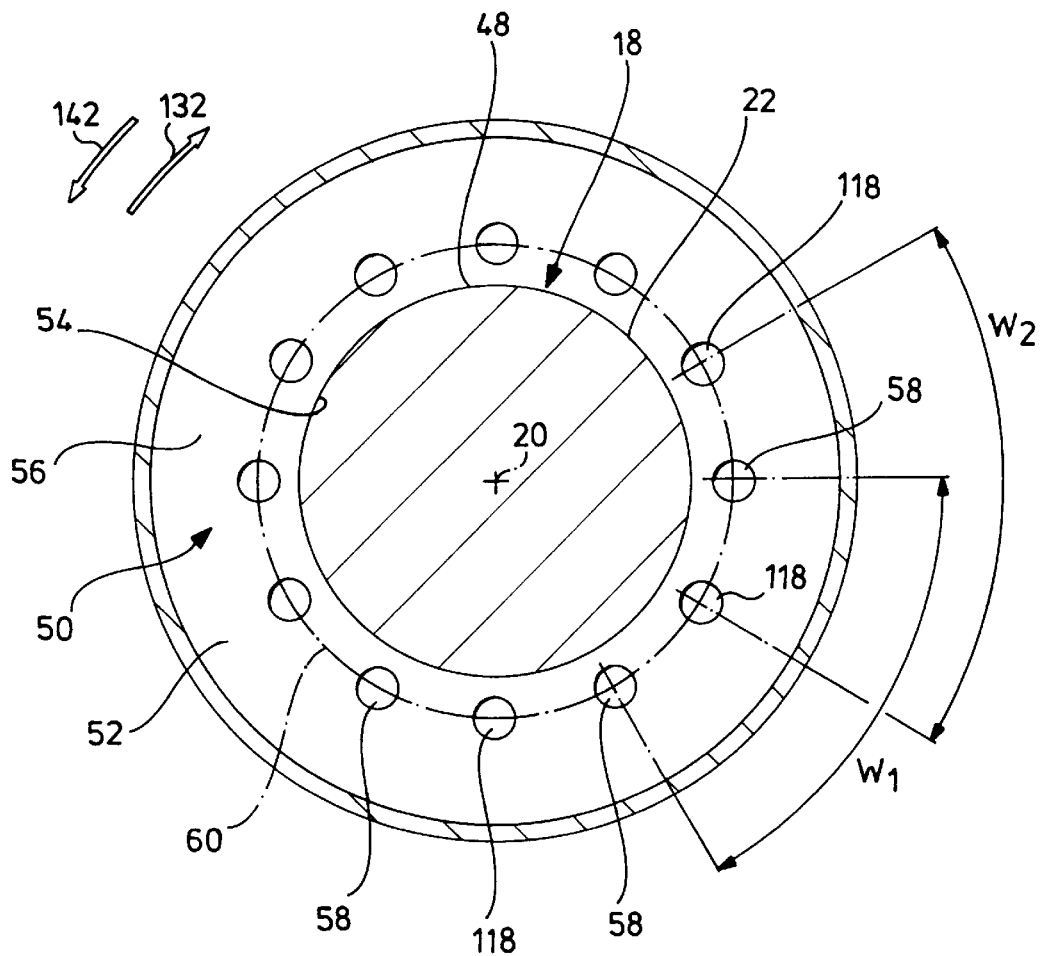
FIG. 4 shows a section along line 4—4 in FIG. 1.

An additional section 48 of the outer cylindrical surface 22 is located on a side of the section 24 of the outer cylindrical surface 22 facing away from the first end 12. This additional section 48 guides a second coupling element which is designated as a whole as 50 and which, as illustrated in FIG. 4, is likewise formed from a second ring 52 which abuts on the cylindrical outer circumferential surface 22 in the section 48 with a cylindrical inner ring surface 54 and thus is rotatable relative to the guide attachment 18 about the axis of rotation 20, namely coaxially thereto.

The second ring 52 is thereby provided with a plurality of locking body receiving means 58 which are arranged at the angular distance W1, are designed as recesses in a plane surface 56 extending at right angles to the axis of rotation 20 and facing the first coupling element 30 and form a second locking element, the locking body receiving means being arranged on a circular line 60 around the axis of rotation 20 which has the same radius as the circular line 38. The locking body receiving means 58 are preferably operative over an angular region in relation to the axis of rotation 20 and designed, for example, in the shape of calottes or as conical depressions. It is, however, also conceivable to design the locking body receiving means as notches extending in a radial direction in relation to the axis of rotation and having, for example, a V-shaped cross section.

The second ring 52 is supported with a plane surface 62 located opposite the plane surface 56 on an axial bearing which is designated as 64 and is again supported, for its part, on a supporting disk 66 which forms a second end 68 of the stub shaft 16.

A pressure ring, which is designated as 70 and is likewise mounted with an inner ring surface 72 on the first section 24 of the outer circumferential surface 22, namely for rotation relative to the guide attachment 18, is arranged on the side of the first coupling element 30 located opposite the second coupling element 50.

The pressure ring 70 has an annular pressure surface 74 facing the first coupling element 30 while a contact surface 76 of the pressure ring 70 located opposite the pressure surface is supported on an axial bearing 80 which, for its part, is again acted upon by a pressure disk 82, on which a stack of cup springs designated as a whole as 84 acts, this stack of cup springs being arranged around a bearing section 86 of the stub shaft 16 and acted upon by an adjusting nut 88 which, for its part, is screwed onto a threaded section 90 of the stub shaft 16. With the adjusting nut 88, it is possible to adjust a pretension of the stack of cup springs 84 and thus a force which extends parallel to the axis of rotation 20 and with which the pressure ring 70 acts on the first coupling element 30 (FIG. 1).

A holding element designated as a whole as 100 (FIG. 2) is arranged around the first coupling element 30 and this holding element has a guide ring 102 which is guided with an inner ring surface 104 on an outer ring surface 106 of the first ring 32 coaxially to the axis of rotation 20 and has entraining fingers 108, each of which engages in a cutaway portion 110 set back in relation to the outer ring surface 106 of the ring 32. Each entraining finger is rotatable over a limited angular area WB in each of the cutaway portions 110 between side walls 111a, b of the respective cutaway portion 110 located opposite one another and preferably extending in radial direction.

The entraining fingers 108 are, for their part, arranged at an angular distance W2 on the guide ring 102 and engage in the respective cutaway portions 110 of the ring 32 arranged at corresponding angular distances so that the guide ring 102 is altogether rotatable through the angular area WB in relation to the ring 32 of the first coupling element 30 (FIG. 2).

Each of the entraining fingers 108 integrally formed on the guide ring 102 is, for its part, provided with an adjusting cam mounting 112, in which an adjusting cam designated as a whole as 114 and designed as a sphere is respectively arranged. The adjusting cam mounting 112 is designed in the same manner as the locking body mounting 40 as a passage through the entraining finger 108, thereby guides the respective adjusting cam 114 such that this is movable relative to the entraining finger 108 in an adjusting direction 116 parallel to the axis of rotation 20 but is otherwise fixed against radial movement in relation to the axis of rotation 20 and azimuthal movement thereto relative to the entraining finger 108.

The adjusting cam mountings 112 are preferably arranged on the same circular line 38 as the locking body mountings 40 in the ring 32 of the first coupling element 30.

The thickness of the guide ring 102 and the entraining fingers 108, measured in the direction of the axis of rotation 20, thereby corresponds approximately to the thickness of the ring 32 or is slightly smaller.

Furthermore, the adjusting cams 114 designed as spheres are essentially the same size as the spheres serving as locking bodies 42.

In addition to the locking body receiving means 58, the second coupling element 50 likewise has adjusting cam outer supports 118 which are designed as recesses proceeding from the plane surface 56 and are at an angular distance W2 from one another and located on the circular line 60 extending around the axis of rotation 20. The recesses are preferably operative over an angular region in relation to the axis of rotation 20 and can, for example, be calotte-like or spherical depressions. It is, however, also possible to design the recesses as notches extending in a radial direction in relation to the axis of rotation 20 and having, for example, a V-shaped cross section.

The adjusting cam outer supports 118 are preferably each arranged centrally between the locking body receiving means 58 and the angular distance W2 between the adjusting cam outer supports 118 is identical to the angular distance W1 between the locking body receiving means 58 so that each locking body receiving means 58 follows an adjusting cam outer support 118 at the angular distance W1/2 or W2/2, as illustrated in FIG. 4.

In the coupled position illustrated in FIG. 3, the coupling elements 30, 50 are turned relative to one another such that the locking bodies 42 and the locking body receiving means 58 are located opposite one another in pairs in a coupling rotary position and, consequently, the locking bodies 42 are movable along the locking direction 44 into an operative position, in which the locking bodies 42 engage in the locking body receiving means 58 with a lower calotte surface 120 and thus form a non-rotatable connection between the first coupling element 30 and the second coupling element 50 which thereby interact directly with one another. In order to maintain the operative position, and to keep the locking bodies 42 with their calotte surfaces 120 in engagement with the locking body receiving means 58, these are acted upon in their coupling rotary position by the pressure surface 74 of the pressure ring 70 in the region of their upper calotte surface 122 located opposite the calotte surface 120. The locking bodies 42 designed as spheres are therefore seated firmly in the locking body receiving means 58 with their calotte surfaces 120, are taken along via the locking body mountings of the ring 32 and thus follow a rotational movement of the ring 32 with the stub shaft 16, then also take along the second coupling element 50 which is connected, for example, with a driven element 130 which engages over the supporting disk 66 and is in non-rotatable, preferably positive rotary connection with the second coupling element 50.

So that the force of the pressure ring 70 can act on the locking bodies 42 in the coupling position of the locking bodies 42 relative to the locking body receiving means 58, the holding element 100 is in its inactive position. In this inactive position, the adjusting cams 114 serving as adjusting elements are located with their lower calotte surfaces 124 in the adjusting cam outer supports 118 which are likewise designed as recesses and likewise serve as adjusting elements, the adjusting cams 114 designed as spheres likewise being acted upon by the pressure surface 74 of the pressure ring 70 with their calotte surfaces 126 located opposite the calotte surfaces 124. A precondition for the fact that the holding element 100 can be located in the inactive position is that the adjusting elements 114, 118 are located relative to one another and in pairs in an initial rotary position (FIGS. 2, 3) and can be brought into engagement due to the action of the pressure ring in an adjusting direction 116. If the adjusting cams 114 are spheres having an identical diameter to that of the locking bodies 42, and the adjusting cam outer supports 118 are of the same shape as the locking body receiving means 58, both the adjusting cams 114 and the locking bodies 42 each experience the same action of the force via the pressure surface 74 in the direction of the second coupling element 50.

In order to be located in the inactive position, the holding element 100 is to be turned relative to the first coupling element 30 into the initial rotary position such that, as illustrated in FIG. 2, the adjusting cam mountings 112 are arranged at the angular distance from the locking body mountings 40 which corresponds to the angular distance of the adjusting cam outer supports 118 from the respectively next adjacent locking body receiving means 58 so that in the illustrated embodiment the adjusting cam mountings 112 are at the angular distance W1/2 or W2/2 from the respectively next adjacent locking body mounting 40. In this position of the holding elements 100, the entraining fingers 108 preferably abut on the side walls 111a of the cutaway portions 110 while an angular distance corresponding to WB remains between the entraining fingers 108 and the side wall 111b.

The inventive coupling is functionally operative when the stub shaft 16 turns in a direction of rotation 132, the side wall 111a being the leading side wall in the direction of rotation 132 and the side wall 111b the trailing side wall in the direction of rotation 132.

Figure 5:
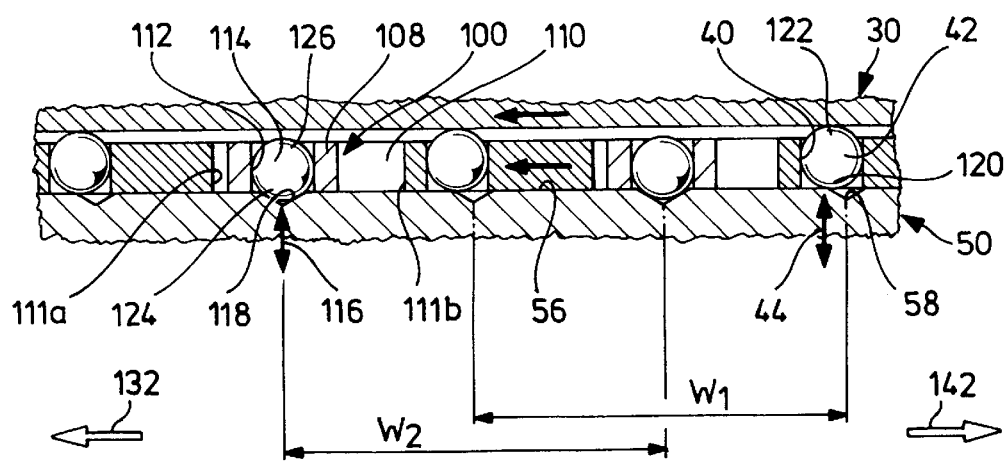
FIG. 5 shows a section similar to FIG. 3 immediately after transition of the locking elements from an operative into an inoperative position and thus transition into the uncoupled position as well as a holding element still in an initial rotary position relative to the second coupling element.

If the driven element 130 is now, for example, blocked in its rotational movement or this experiences at least a sufficiently large countertorque, a so-called unlocking torque of the coupling 10 is exceeded, the conditions immediately following a blocking of the driven element 130 being illustrated in FIG. 5.

If the first coupling element 30 continues to turn in the direction of rotation 132 relative to the second coupling element 50 proceeding from the coupling rotary position when the driven element 130 is blocked and thus the second coupling element 50 is also blocked with respect to its rotational movement, this leads to the locking bodies 42 leaving the locking body receiving means 58 due to their calotte surface 120 which acts as an inclined surface. This does, however, cause the locking bodies 42 to act on the pressure surface 74 of the pressure ring 70 with their calotte surfaces 122 contrary to the force of the stack of cup springs 84 and to move the pressure ring 70 away from the second coupling element 50 while leaving the locking body receiving means 58, namely as far as a distance between plane surface 56 and pressure surface 74 which corresponds to the diameter of the locking bodies 42 designed as spheres (FIG. 5).

This means that there is now no non-rotational connection between the first coupling element 30 and the second coupling element 50. In this respect, the first coupling element 30 moves further in the direction of rotation 132 and the locking bodies 42 thereby roll along the plane surface 56 so that the pressure ring 70 likewise turns in the direction 132 but with double the speed of the first coupling element 30 since the locking bodies 42 designed as spheres roll along the stationary plane surface 56 of the second coupling element 50. This rotational movement of the first coupling element 30 relative to the second coupling element 50 has no influence on the holding element 100 for as long as the clearance of WB between the entraining finger 108 and a respectively trailing side wall 111b, in the direction of rotation, of the respective cutaway portion 110 receiving the entraining finger 108 exists due to the size of the cutaway portions 110 and, consequently, the holding element 100 remains in the initial rotary position relative to the second coupling element 50. If this clearance no longer exists due to the further rotation of the ring 32 in relation to the stationary guide ring 102 and the trailing side wall 111b, in the direction of rotation, abuts on the respective entraining finger 108 (FIG. 6), the holding element 100 is taken along in the direction of rotation 132 by the rotational movement of the first coupling element 30 and leaves the initial rotary position relative to the second coupling element 50. In this respect, the adjusting cams 114—as illustrated in FIG. 7—can run out of the adjusting cam outer supports 118 without any problem since the upper calotte surface 126 of the adjusting cams 114 designed as spheres is no longer acted upon by the pressure surface 74 of the pressure ring 70 and so the adjusting cams 114 designed as spheres likewise roll along the plane surface 56 after leaving the adjusting cam outer supports 118.

Due to the removal of the clearance between the side wall 111b of the respective cutaway portion 110 and the respective entraining finger 108, a limited relative rotation of the holding element 100 has taken place relative to the first coupling element 30 (FIG. 6) and so the adjusting cam mountings 112 are no longer at an angular distance W1/2 or W2/2 in relation to the respectively following locking body mounting 40. This means that a distance between the pressure surface 74 of the pressure ring 70 and the plane surface 56 of the second coupling element 50 is maintained either by the locking bodies 42 or the adjusting cams 114 and so, on the one hand, when the locking bodies 42 are in the coupling rotary position over the locking body receiving means 58, the pressure ring 70 cannot move these in the locking direction 44 into the locking body receiving means 58 (FIG. 8) and, on the other hand, the pressure ring 70 cannot move the adjusting cams 114 designed as spheres in the adjusting direction 116 into the adjusting cam outer supports 118 even when the initial rotary position between holding element 100 and second coupling element 50 is reached (FIG. 7).

As a result of the locking body receiving means 58 and adjusting cam outer supports 118 preferably being operative over an angular region, the locking bodies 42 and the adjusting cams 114 are in a supporting condition together (e.g., wherein the locking bodies 42 support rotational movement of the first coupling element 30 relative to the second coupling element 50, and the adjusting cams 114 support rotational movement of the holding element 100 relative to the second coupling element 50) only over a narrow angular region of less than 5°, preferably 2°, during a rotation of the first coupling element 30 in relation to the second coupling element 50; in all the other rotary positions either the locking bodies 42 are in a coupling rotary position or the adjusting cams 114 are in an initial rotary position relative to the second coupling element.

This means that when the stub shaft 16 continues to be driven the coupling remains released and due to the rolling movement of the locking bodies 42 and adjusting cams 114, the first coupling element 30 and the holding element 100 taken along by it are rotatable without any appreciable countertorque in an unlimited manner in relation to the second coupling element 50.

The coupling 10 is thus released for such a time until a drive of the stub shaft 16 is interrupted and a rotation of the stub shaft 16 in a direction of rotation 142, contrary to the direction of rotation 132, takes place. The first coupling element 30 is thereby rotated in relation to the holding element 100 contrary to the direction of rotation 132 to such an extent that the entraining fingers 108 move away from the trailing side wall 111*b*, in the direction of rotation 132, and namely for such a time until these again abut on the leading side wall 111*a*, in the direction of rotation 132 (FIG. 2). In this position of the entraining fingers 108, the locking bodies 42 and the adjusting cams 114 are again at an angular distance W1/2 or W2/2 and so when the coupling rotary position is reached, i.e. congruent position of the locking bodies 42 with the locking body receiving means 58 in pairs, and at the same time the initial rotary position is possibly reached, i.e. congruent position of the adjusting cams 114 with the adjusting cam outer supports 118 in pairs, these are brought into engagement again with one another under the influence of the force of the stack of cup springs 84 and the coupling position according to FIG. 3 is reached.

The transition from the uncoupled position into the coupled position is facilitated by the fact that the locking bodies 42 and the adjusting cams 114 are in supporting condition together only over a narrow angular region and therefore during rotation contrary to the direction of rotation 132 a slight relative rotation between first coupling element 30 and holding element 100 is adequate to bring both into the coupling rotary position and initial rotary position at the same time.

If the coupling 10 is intended to be designed such that a transition from the coupled position into the uncoupled position takes place independently of the drive direction of rotation, the cutaway portions 110 are to be designed such that the entraining fingers 108 engaging in them can move in both directions of rotation with clearance WB proceeding from the initial rotary position of the holding element 100. This means that the inactive rotary position relative to the first coupling element 30 is no longer defined by the side wall 111*a* but only by the adjusting cam outer supports 118, whereby the inactive rotary position can be reached reliably due to the, for example, V-shaped or conical design of the adjusting cam outer supports 118 extending over an angular region, in particular with a, for example, V-shaped or conical design of the locking body receiving means 58 likewise extending over an angular region.

To summarize, the inventive coupling 10 can thus be transferred from the coupled (FIG. 3) into the uncoupled position (FIGS. 7, 8) when the unlocking torque is exceeded without any appreciable countertorque occurring in this uncoupled position between the first coupling element 30 and the second coupling element 50 due to the locking elements 42, 58 touching.

The embodiment of an inventive coupling 10 illustrated in FIG. 1 represents an assembly for machine tools which can be used separately, with, for example, the machine tool which is not illustrated in the drawings driving the stub shaft 16 at the first end with its driven shaft and a rotating tool, preferably a rotating cutting tool, for example a drill bit, being driven via the driven element 130 directly or indirectly.

The inventive coupling 10 designed as a separate assembly can, however, also be used in the reverse manner, i.e. a drive can take place via the driven element 130 and a tool can be driven via the stub shaft 16.

In this case, the inventive coupling likewise functions in the manner described in the above, with the difference that the drive element has to be driven with a direction of rotation 142 which extends exactly opposite to the direction of rotation 132. In this case, the first coupling element 30 remains stationary when the rotational movement of the stub shaft 16 is blocked whereas the second coupling element 50 continues to move, whereby the locking bodies 42 likewise move the pressure ring 70 away from the second coupling element 50. In addition, the holding element 100 first of all moves with the second coupling element 50 in the direction of rotation 142 for such a time until the entraining fingers 108 abut on the side walls 111*b*. In this position, the holding element 100 and the first coupling element 30 are, in the same manner as described in detail in the above, turned in relation to one another to such an extent that the inventive coupling 10 remains in its uncoupled position for such a time until a drive of the driven element 130 is interrupted and the driven element 130 is rotated contrary to the direction of rotation 142.

In a second embodiment 210 of an inventive coupling, this is integrated into a machine tool designated as a whole as 160 and illustrated schematically.

The machine tool comprises a drive motor 162 which is accommodated in a housing 164 of the machine tool and has a driven shaft 166 which, for its part, is again mounted in the housing 164 via a bearing 168 and on which a gear wheel 170 is seated which meshes with an outer toothing 172 of the second coupling element 250. In this second embodiment 210 of the inventive coupling, the stub shaft 216 is mounted in the housing 164 at its first end 212 and with a cylindrical section 267 following the supporting disk 266 and following the cylindrical section 267 is rigidly connected with a drilling tool 174, preferably a drill bit.

In contrast to the first embodiment, a drive is thus carried out in the second embodiment 210 of the inventive coupling by means of the drive motor 162 via the second coupling element 250 whereas the first coupling element 30 which is non-rotatably connected to the stub shaft 216 then drives the tool 174 via the stub shaft 216.

The second embodiment 210 of the inventive coupling operates in the same manner as that described in conjunction with the drive of the first embodiment 10 of the inventive coupling via the driven element 130 in the direction of rotation 142.

In the second embodiment of the inventive coupling 210, illustrated in FIG. 9, the second coupling element is, in contrast to the first embodiment 10 of the inventive coupling, provided with a recess which is designated as a whole as 176 and the bottom surface 178 of which forms the plane surface 56 described in conjunction with the first embodiment 10, the locking body receiving means and the adjusting cam outer supports likewise being integrally formed as additional recesses.

The first coupling element 30, the pressure ring 70, the axial bearing 80 and the pressure disk 82 are then inserted into the recess 176 so that these are arranged in a space-saving manner and additionally enclosed in the second coupling element 250. The stack of cup springs 84, which is arranged to follow the second coupling element 250 and is seated on the stub shaft 216 and which, for its part, is again supported on the adjusting nut 88, acts on the pressure disk 82.

In addition, rollers are used as rolling bodies in the second embodiment 210 of the inventive coupling instead of the locking bodies 42 and the adjusting cams 114 designed as spheres and these rollers are rotatable about an axis extending radially to the axis of rotation 20 of the stub shaft 16.

With respect to the remaining features and functions of the second embodiment, reference is made in full to the explanations concerning the first embodiment.

Figure 10:
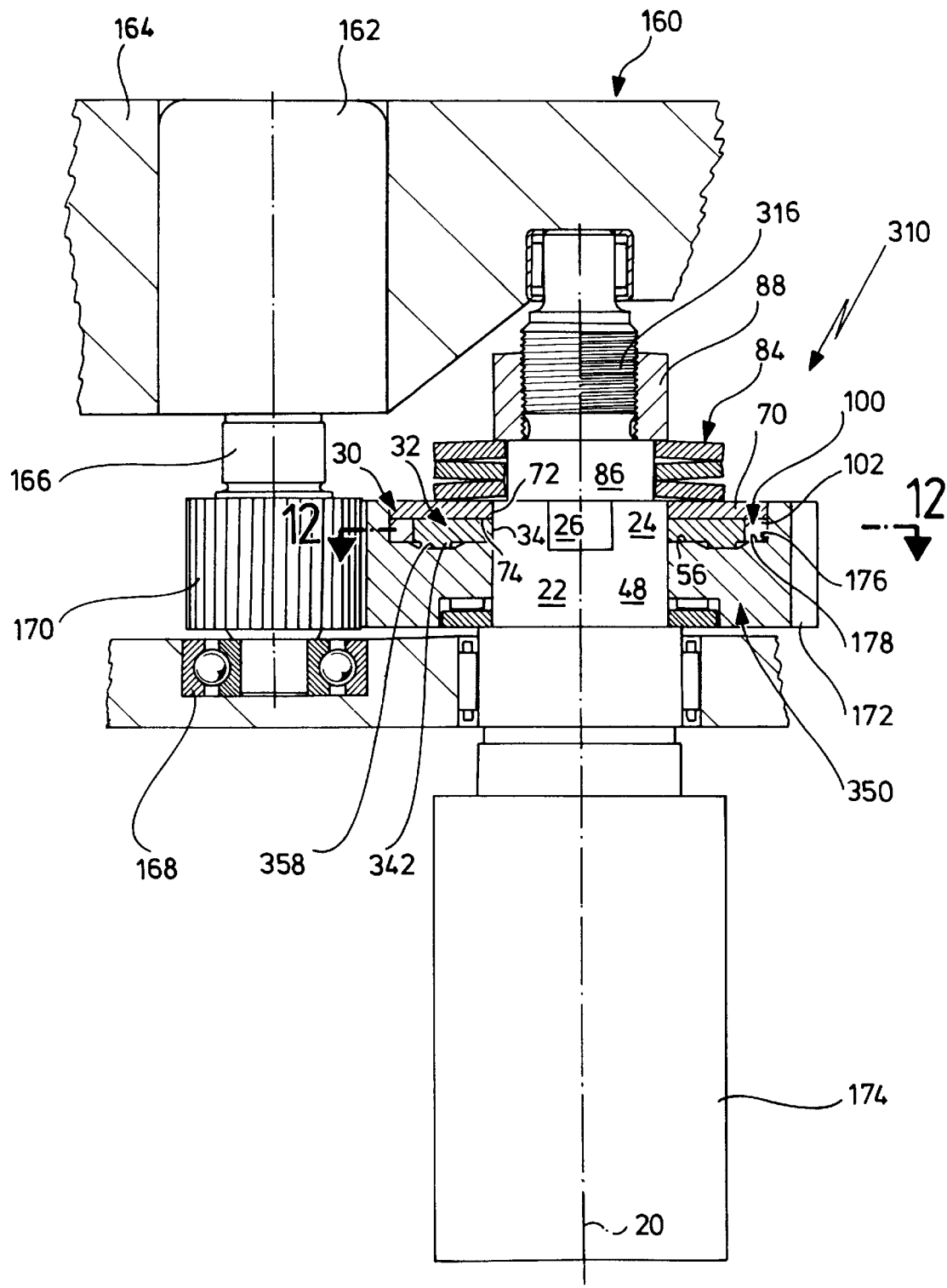
FIG. 10 shows a longitudinal section similar to FIG. 9 through a third embodiment of an inventive coupling in a machine tool.

In a third embodiment of an inventive coupling 310, illustrated in FIG. 10, this is driven and the tool is driven by means of this coupling 310 in the same manner as that described in conjunction with the second embodiment and so the same reference numerals are used for the same parts and reference is made in full to the description of these parts in conjunction with the second embodiment.

Figure 11:
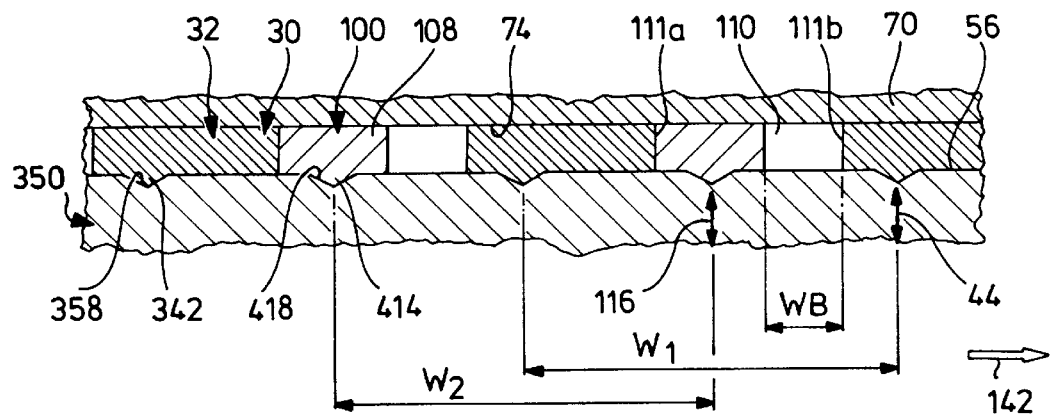
FIG. 11 shows a section corresponding to FIG. 3 through the third embodiment.
Figure 12:
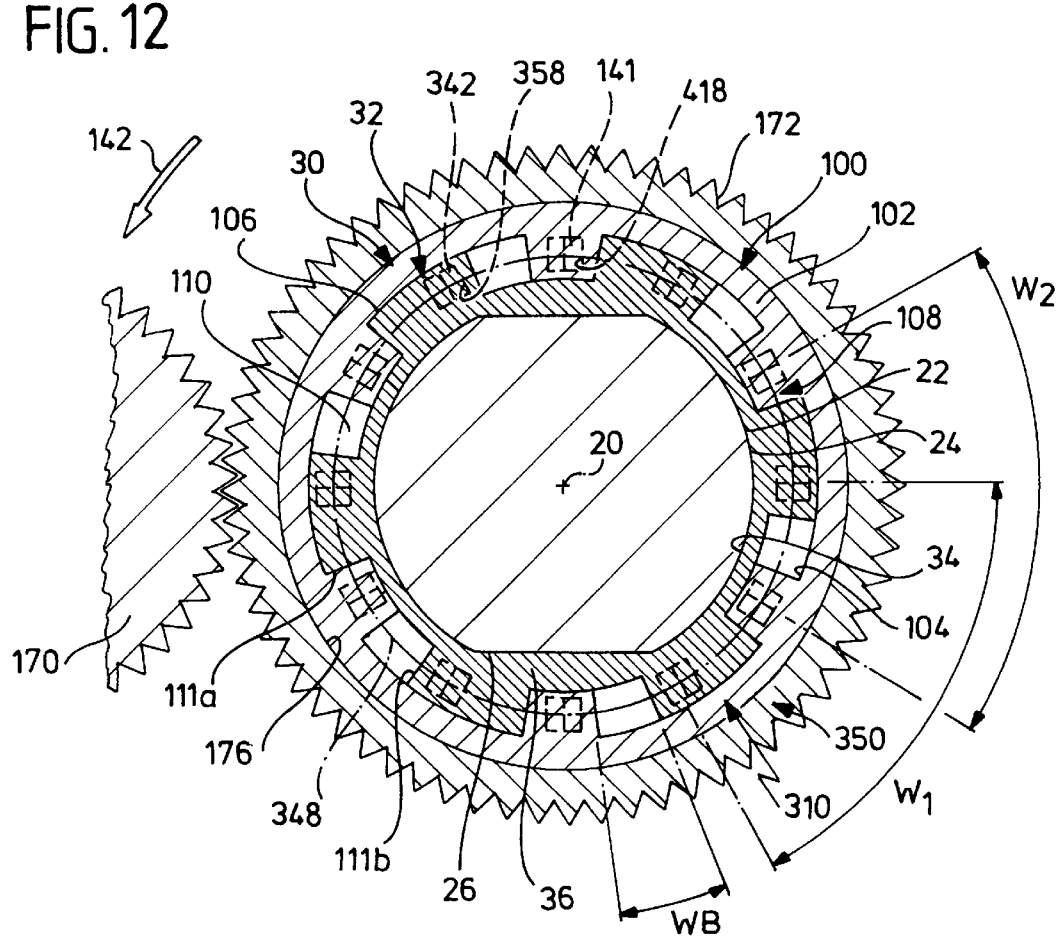
FIG. 12 shows a section along line 12—12 in FIG. 10 with a holding element in an inactive rotary position relative to the first coupling element corresponding to FIG. 2.

In the third embodiment 310 of the inventive coupling, as illustrated in FIG. 11, an elevation 342 is, for example and in contrast to the first and second embodiments, integrally formed in one piece on the first ring 32 instead of a sphere as locking body and so the locking body mountings 40 can also be omitted. In addition, an elevation 414 is likewise integrally formed, for example, in one piece on the respective entraining finger 108 instead of an adjusting cam 114 designed as a sphere and so the adjusting cam mountings 112 can also be omitted. The locking bodies 342 and the adjusting cams 414 are, however, still located, as illustrated in FIG. 12, on the circular line 348 around the axis of rotation 20. In addition, the locking bodies 342 are arranged at angular distances W1 on the first ring 32 and the adjusting cams 414 at angular distances W2 on the entraining fingers 108 of the guide ring 102.

The locking body receiving means 358 and the adjusting cam outer supports 418 are arranged at the same angular distances W1 and W2, respectively, in the plane surface 56 of the second coupling element 350 of the inventive coupling, in the same manner as in the first embodiment, the locking body receiving means 358 and the adjusting cam outer supports 418 thereby being adapted in their shape to the locking bodies 342 and the adjusting cams 414, respectively. The locking bodies 342 and the adjusting cams 414 preferably have the same, essentially triangular cross section when considered in a radial direction in relation to the axis of rotation 20.

In contrast to the first and second embodiments, it is provided in the third embodiment for the pressure ring 70 to act with its pressure surface 74 directly on the first ring 32 or the guide ring 102 with the entraining fingers 108, namely on their respective surfaces located opposite the locking bodies 342 and adjusting cams 414.

The third embodiment of the inventive coupling operates as described in conjunction with the first embodiment 10 of the inventive coupling in the case of a drive via the driven element 130.

Figure 13:
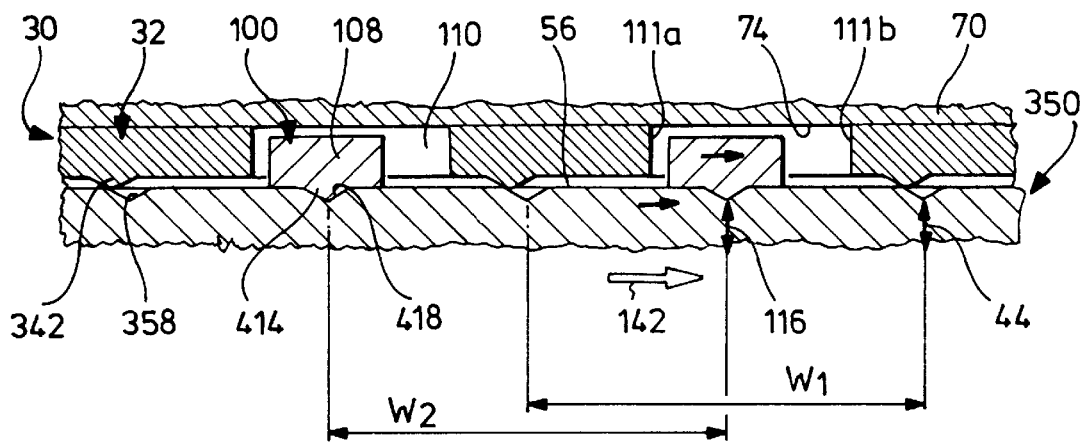
FIG. 13 shows a section similar to FIG. 11 immediately after a transition of the coupling into the uncoupled position and a holding element still in an initial rotary position corresponding to FIG. 5.

As illustrated in FIG. 13, the second coupling element 350 continues to rotate when the stub shaft 316 is blocked and thus the first coupling element 30 is likewise blocked, whereby the locking bodies 342 slide out of the locking body receiving means 358 and move the pressure ring 70 away from the plane surface 56 of the second coupling element 350 contrary to the force of the stack of cup springs 84. This means that the second coupling element 350 continues to rotate in the direction of rotation 142. During this rotation, the second coupling element takes along the holding element 100 which first of all engages with the adjusting cams 414 in the adjusting cam outer supports 418 for such a time until the entraining fingers 108 come to rest on the side walls 111b of the cutaway portions 110 (FIG. 14).

Figure 14:
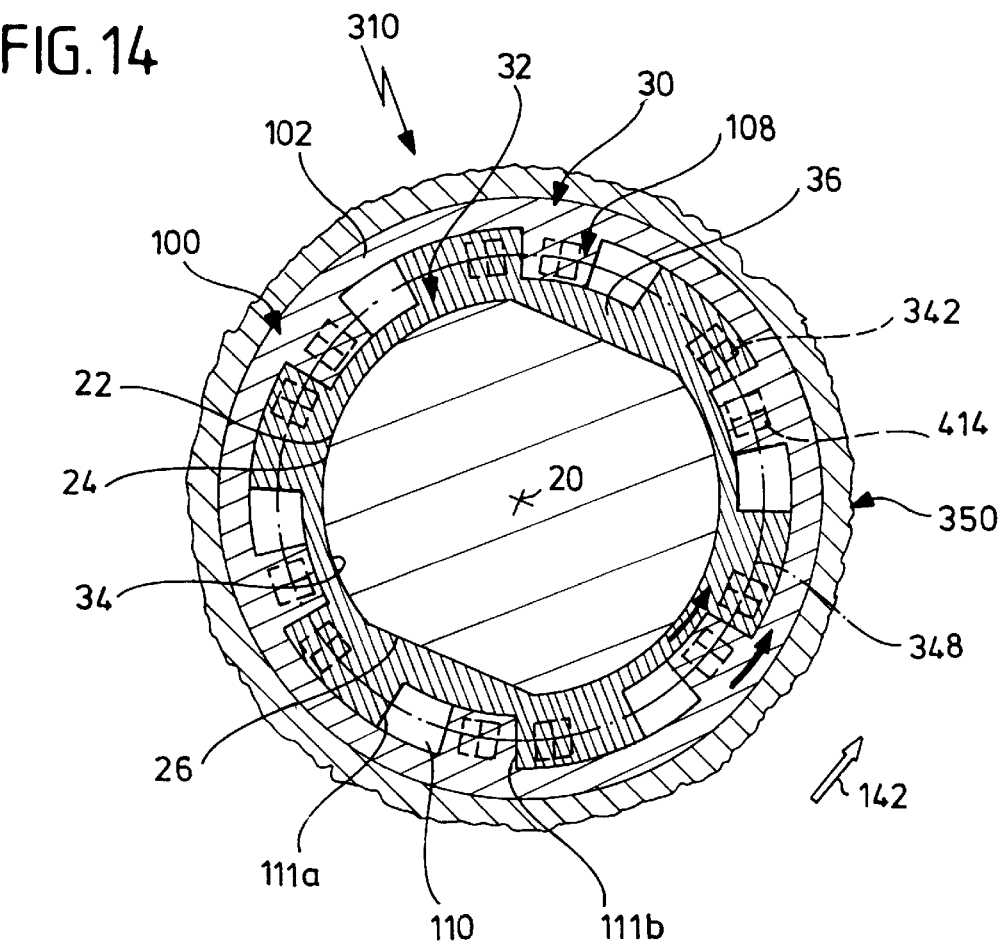
FIG. 14 shows a section similar to FIG. 12 with a holding element in an active rotary position corresponding to FIG. 6.
Figure 15:
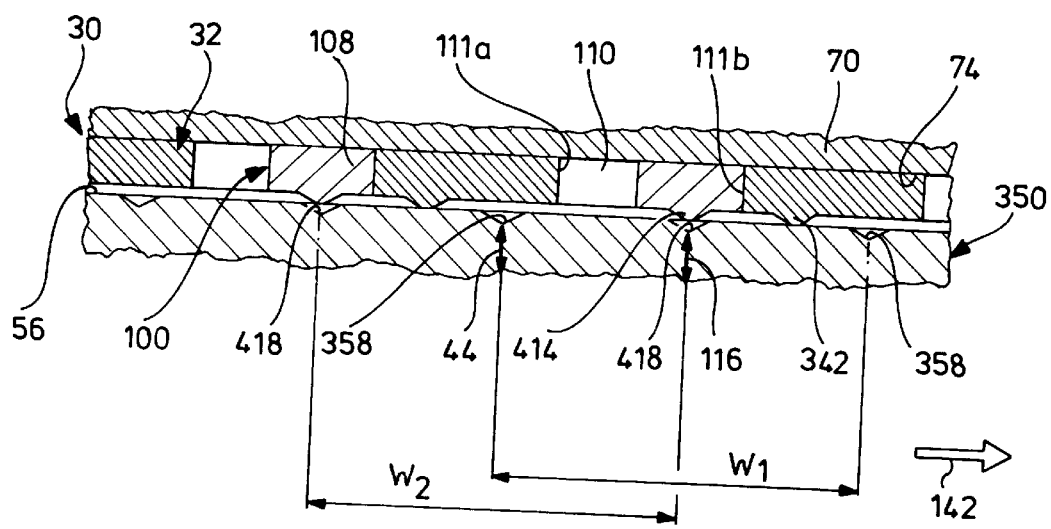
FIG. 15 shows a section similar to FIG. 11 with a holding element in an active rotary position relative to the first coupling element and a holding element in an initial rotary position relative to the second coupling element corresponding to FIG. 7
Figure 16:
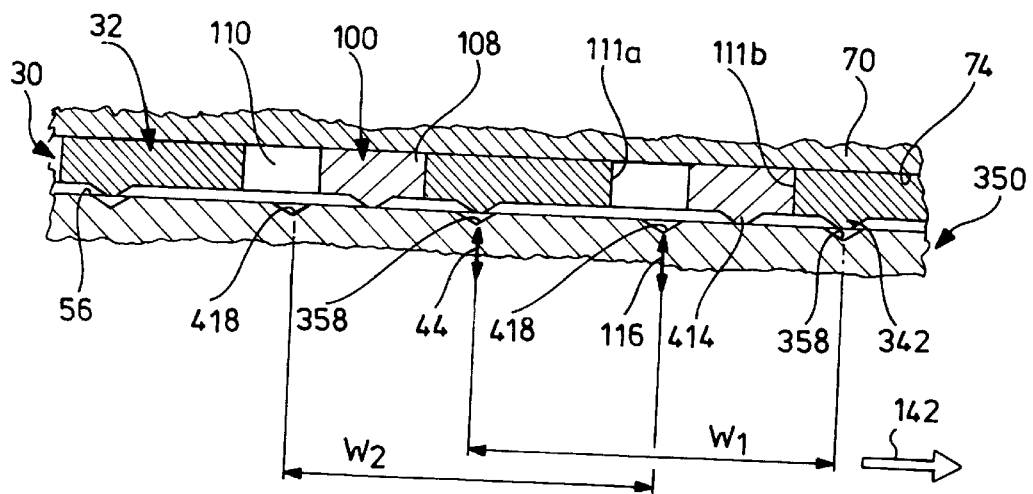
FIG. 16 shows a section similar to FIG. 11, with a holding element in an active rotary position relative to the first coupling element and locking elements located in a coupling rotary position relative to one another, corresponding to FIG. 8.

This means that the holding element 100 is rotated relative to the first coupling element 30 to such an extent that the entrainment of the holding element 100 by the second coupling element 350 is blocked and thus the adjusting cams 414 also disengage from the adjusting cam outer supports 418 and the holding element 100 is likewise moved as a whole away from the second coupling element 350 and abuts with its surface located opposite the adjusting cams 414 on the pressure surface 74 of the pressure ring 70, as illustrated in FIGS. 14 to 16. In this active rotary position of holding element 100 and first coupling element 30, the coupling remains in its uncoupled position.

In contrast to the first two embodiments, a sliding friction occurs between the locking bodies 342 acted upon by the force of the stack of cup springs 84 or the adjusting cams 414 and the plane surface 56 of the second coupling element 350 in the released position of the coupling and so the counter-torque is greater than during the rolling friction due to the rolling bodies of the first or second embodiment.

The coupling moves into the coupled position in the same way as that described in conjunction with the first embodiment during the drive via the driven element 130. As for the rest, reference is made in full to the description of the first and second embodiments with respect to the construction and functioning of the individual components.

What is claimed is:

1. A coupling for motorized machine tools, comprising:
    a driven side and a drive side which are releasable from one another;
    a first coupling element which is non-rotatably connected to one of said driven side and said drive side, said first coupling element being rotatable about an axis of rotation, and having at least one first locking element associated therewith;
    a second coupling element which is non-rotatably is connected to another one of said driven side and said drive side, said second coupling element being rotatable about said axis of rotation and having at least one second locking element associated therewith;
    said first and second locking elements being moveable relative to each other from a coupled position to an uncoupled position when a predetermined triggering torque occurs;
    a holding element coaxial with said first coupling element, said first coupling element and said holding element cooperating via a protrusion arranged on one of said first coupling element and said holding element, and two movement limiting surfaces, having a spacing in an azimuthal direction, being arranged on another one of said first coupling element and said holding element, said spacing of said movement limiting surfaces allowing rotational movement of said holding element with respect to said first coupling element to only a limited extent, said rotational movement enabling said holding element to transition between an inactive position and an active position;
    an elastic force storing means; wherein:
        in said coupled position, said elastic force storing means acts on at least one of said first and second locking elements to maintain said first and second locking elements in said coupled position, thereby causing said first and second coupling elements to rotate in concert;

when said predetermined triggering torque occurs, said first and second locking elements are moved relative to each other into said uncoupled position and said holding element is moved with respect to said first and second coupling elements from said inactive position to said active position;

in said uncoupled position, said first and second locking elements are rotatable relative to each other into a coupling rotary position and away from said coupling rotary position, and when said first and second locking elements are in said coupling rotary position:

(a) said first and second locking elements enter into said coupled position when said holding element is in said inactive position because said holding element allows said elastic force storing means to act on said at least one of said first and second locking elements; and (b) said first and second locking elements maintain said uncoupled position when said holding element is in said active position because said holding element prevents said elastic force storing means from acting on said at least one of said first and second locking elements.

2. A coupling as defined in claim 1, wherein, once said predetermined triggering torque has occurred and said holding element is in said active position, the holding element prevents a transition of the first and second locking elements from the uncoupled position into the coupled position when the coupling rotary position has been reached for as long as the coupling is being driven on the drive side.

3. A coupling as defined in claim 1, wherein:

the holding element is adapted to be brought from the inactive position into the active position by relative rotational movement between the first and second coupling elements.

4. A coupling as defined in claim 1, wherein:

the holding element is adapted to be brought from the inactive position into the active position by rotational movement of the holding element relative to at least one of the first and second coupling elements.

5. A coupling as defined in claim 4, wherein:

the holding element is adapted to be brought from the inactive position into the active position by rotational movement of the holding element relative to both of the first and second coupling elements.

6. A coupling as defined in claim 1, wherein:

the holding element, in the active position, prevents the elastic force storing means from acting on said at least one of said first and second locking elements to allow said first and second locking elements to maintain the uncoupled position when the first and second locking elements are in said coupling rotary position.

7. A coupling as defined in claim 1, wherein:

the holding element is supported, in the active position, on said second coupling element.

8. A coupling as defined in claim 7, wherein:

the holding element is unlimitedly rotatable about the axis of rotation relative to the second coupling element while said holding element is in the active position.

9. A coupling as defined in claim 8, wherein:

when the holding element is in the active position, the holding element and the first coupling element are unlimitedly rotatable relative to the second coupling element.

10. A coupling as defined in claim 9, wherein:

the holding element is limitedly rotatable in relation to the first coupling element from the inactive position to the active position.

11. A coupling as defined in claim 7, wherein:

when the holding element is in the active position, the holding element and the first coupling element are positionable with respect to one another between an active rotary position and an inactive rotary position; and when the holding element is in the inactive rotary position and the holding element and the second coupling element are positioned with respect to one another in an initial rotary position, the holding element is adapted to be transferred from the active position to the inactive position.

12. A coupling as defined in claim 11, wherein:

when the first and second locking elements are in the coupled position, the holding element is located in the initial rotary position, and, at the same time, the first and second locking elements are located in the coupled position such that the elastic force storing means holds the first and second locking elements in the coupled position.

13. A coupling as defined in claim 11, wherein when the holding element and said first coupling element are positioned in said active rotary position with respect to each other:

(a) either the first and second locking elements are positioned away from the coupling rotary position and remain in the uncoupled position when the holding element is located in the initial rotary position; or (b) the first and second locking elements are located in the coupling rotary position when the holding element is located away from the initial rotary position.

14. A coupling as defined in claim 11, wherein:

the first and second coupling elements are designed such that the first and second locking elements, when rotated away from the coupling rotary position, maintain said first and second coupling elements uncoupled from one another.

15. A coupling as defined in claim 11, wherein:

the holding element and the second coupling element are designed such that when the holding element is in the active position, the holding element is held in the active position in all rotary positions of the holding element relative to the second coupling element which are away from the initial rotary position, thereby preventing any transition of the first and second locking elements from the uncoupled position to the coupled position.

16. A coupling as defined in claim 11, wherein:

interacting adjusting elements are provided for moving the holding element from the inactive position to the active position.

17. A coupling as defined in claim 16, wherein:

at least one of the adjusting elements has an inclined surface, and at least one other of the adjusting elements is movable relative to said inclined surface in an adjusting direction.

18. A coupling as defined in claim 16, wherein:

the adjusting elements displace the holding element in an adjusting direction during rotational movement of said holding element relative to said second coupling element.

19. A coupling as defined in claim 16, wherein:

said interacting adjusting elements are arranged in pairs with each pair being operative between the holding element and the second coupling element.

20. A coupling as defined in claim 19, wherein:

each one of said interacting adjusting elements has an identical design and is arranged in an axially symmetrical pattern in relation to the axis of rotation.

21. A coupling as defined in claim 11, wherein:

at least one interacting pair of adjusting elements is provided for moving the holding element from the inactive position to the active position;

at least one pair of said first and second locking elements is provided said second locking element of said at least one pair of said first and second locking elements is arranged on the second coupling element according to a first pattern;

one of said adjusting elements of said at least one pair of adjusting elements is arranged on the second coupling element according to a second pattern, said first and second patterns on said second coupling element being arranged with a defined relative position with respect to each other;

said first locking element of said at least one pair of said first and second locking elements is arranged on the first coupling element according to said first pattern;

another one of said adjusting elements of said at least one pair of adjusting elements is arranged on said holding element in said second pattern;

when the holding element is in the inactive position, said another one of said at least one pair of adjusting elements is arranged in said defined relative position with respect to said first locking element; and when the holding element is in the active position, one of said at least one pair of adjusting elements said another is rotated with respect to said first locking element.

22. A coupling as defined in claim 1, wherein:

said first and second locking elements comprise a plurality of locking elements operative between the first and second coupling elements.

23. A coupling as defined in claim 22, wherein:

each one of said plurality of locking elements being identically designed and arranged in axial symmetry in relation to said axis of rotation.

24. A coupling as defined in claim 23, wherein:

a plurality of adjusting elements are operative between the holding element and the second coupling element; wherein the plurality of adjusting elements are arranged in said axial symmetry in relation to said axis of rotation.

25. A coupling as defined in claim 11, wherein:

when the holding element is in an initial rotary position, the at least one of said first and second locking elements is adapted to be transferred from the uncoupled position to the coupled position by the elastic force storing means acting on said at least one of said first and second locking elements.

26. A coupling as defined in claim 11, wherein:

the holding element is adapted to be transferred from the inactive position to the active position only when the first and second locking elements are in the uncoupled position.

27. A coupling as defined in claim 26, wherein:

the holding element is movable from the inactive position into the active position when the first and second locking elements are in the uncoupled position.

28. A coupling as defined in claim 27, wherein:

the first and second locking elements, in the uncoupled position, prevent the elastic force storing means from acting on the holding element during movement of the holding element from the inactive position into the active position.

* * * * *